(12) United States Patent
Tran et al.

(10) Patent No.: US 12,184,968 B2
(45) Date of Patent: *Dec. 31, 2024

(54) SYSTEMS AND METHODS FOR SUGGESTING VIDEO FRAMING

(71) Applicant: GoPro, Inc., San Mateo, CA (US)

(72) Inventors: Peter Tran, San Diego, CA (US); Douglas D. Melton, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/160,996

(22) Filed: Jan. 27, 2023

(65) Prior Publication Data

US 2023/0171486 A1 Jun. 1, 2023

Related U.S. Application Data

(63) Continuation of application No. 17/536,476, filed on Nov. 29, 2021, which is a continuation of application No. 17/125,952, filed on Dec. 17, 2020, now Pat. No. 11,190,680.

(60) Provisional application No. 62/952,595, filed on Dec. 23, 2019.

(51) Int. Cl.
| | |
|---|---|
| *H04N 23/695* | (2023.01) |
| *G11B 27/00* | (2006.01) |
| *G11B 27/031* | (2006.01) |
| *H04N 23/60* | (2023.01) |
| *H04N 23/698* | (2023.01) |
| *H04R 3/00* | (2006.01) |

(52) U.S. Cl.
CPC .......... *H04N 23/64* (2023.01); *G11B 27/005* (2013.01); *G11B 27/031* (2013.01); *H04N 23/695* (2023.01); *H04N 23/698* (2023.01); *H04R 3/005* (2013.01)

(58) Field of Classification Search
CPC .... H04N 23/64; H04N 23/695; H04N 23/698; G11B 27/005; G11B 27/031; H04R 3/005
See application file for complete search history.

(56) References Cited

U.S. PATENT DOCUMENTS

| | | | |
|---|---|---|---|
| 10,643,303 B1 | 5/2020 | Cotoros | |
| 10,742,882 B1 | 8/2020 | Oulès | |
| 10,970,602 B1 | 4/2021 | Cunningham | |
| 10,992,880 B1 | 4/2021 | Stimm | |
| 11,190,680 B1 | 11/2021 | Tran | |
| 2016/0149956 A1* | 5/2016 | Birnbaum | H04L 63/101 726/1 |
| 2019/0348075 A1* | 11/2019 | Derbanne | G11B 27/005 |
| 2022/0086339 A1 | 3/2022 | Tran | |

* cited by examiner

*Primary Examiner* — Thai Q Tran
*Assistant Examiner* — Jose M Mesa
(74) *Attorney, Agent, or Firm* — ESPLIN & ASSOCIATES, PC

(57) ABSTRACT

A video may include a capture of a scene, such as a wide-field of view capture of the scene. Context of the video may be assessed and used to suggest framing of the video. The framing of the video may be presented within a user interface. A user may select, through the user interface, the framing to be used in generating presentation of the video.

20 Claims, 11 Drawing Sheets

SYSTEMS AND METHODS FOR SUGGESTING VIDEO FRAMING

FIELD

This disclosure relates to suggesting video framing based on context of videos.

BACKGROUND

A video may include greater visual capture of one or more scenes, objects, and/or activities than may be viewed at a time. Determining which portion(s) of the video should be presented during playback may be difficult and time consuming.

SUMMARY

This disclosure relates to suggesting framing of videos. Video information defining a video and/or other information may be obtained. The video may include video content having a progress length. The video content may include visual content viewable as a function of progress through the progress length. The visual content may have a field of view. Context of the video content as the function of progress through the progress length may be assessed. A set of framing of the visual content at one or more moments within the progress length may be determined based on the context of the video content and/or other information. An individual framing of the visual content may define a positioning of a viewing window within the field of view of the visual content at a corresponding moment within the progress length. The viewing window may define extents of the visual content to be included within a presentation of the video content. The set of framing of the visual content may be provided for use in generating the presentation of the video content.

A system that suggests framing of videos may include one or more electronic storages, one or more processors, and/or other components. An electronic storage may store video information, information relating to video, information relating to visual content, information relating to context of video content, information relating to framing of visual content, information relating to a viewing window, and/or other information. In some implementations, the system may include one or more optical elements, one or more image sensors, one or more sound sensors, one or more position sensors, and/or other components.

One or more components of the system may be carried by a housing, such as a housing of an image capture device. For example, the optical element(s), the image sensor(s), the sound sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate suggesting framing of videos. The machine-readable instructions may include one or more computer program components. The computer program components may include one or more of a video information component, a context component, a framing component, a provision component, and/or other computer program components.

The video information component may be configured to obtain video information and/or other information. Video information may define a video. The video may include video content having a progress length. The video content may include visual content viewable as a function of progress through the progress length. The visual content may have a field of view.

In some implementations, the video may include a spherical video. The field of view of the visual content may include a spherical field of view. The visual content may be viewable from a point of view as the function of progress through the progress length.

The context component may be configured to assess context of the video content. The context of the video content may be assessed as the function of progress through the progress length. In some implementations, the context of the video content may include direction of audio content captured with the visual content. In some implementations, the audio content may include recording of one or more voices captured during capture of the visual content. The direction of the voice(s) may be represented by one or more audio vectors. In some implementations, the context of the video content may include motion of an image capture device that captured the visual content.

The framing component may be configured to determine a set of framing of the visual content at one or more moments within the progress length based on the context of the video content and/or other information. A set of framing of the visual content may include one or more framing of the visual content. An individual framing of the visual content may define a positioning of a viewing window within the field of view of the visual content at a corresponding moment within the progress length. The viewing window may define extents of the visual content to be included within a presentation of the video content. In some implementations, an individual framing of the visual content may define a positioning of the viewing window within the field of view of the visual content based on a viewing direction, a viewing size, a viewing rotation, and/or other information.

In some implementations, the set of framing of the visual content may include a first framing of the visual content at a first moment within the progress length, a second framing of the visual content at a second moment within the progress length, and/or other framing of the visual content at other moments within the progress length. The second framing of the visual content may be different from the first framing of the visual content.

In some implementations, the set of framing of the visual content may be determined based on the audio vector(s) and/or other information. In some implementations, the set of framing of the visual content may be determined based on the motion of the image capture device and/or other information. The set of framing of the visual content may be determined to follow the motion of the image capture device.

The provision component may be configured to provide the set of framing of the visual content for use in generating the presentation of the video content. In some implementations, use of the first framing of the visual content and the second framing of the visual content in generating the presentation of the video content may include determining a viewing path for the viewing window between the first moment and the second moment. The viewing path may define the positioning of the viewing window within the field of view of the visual content as the function of progress through the progress length. The positioning of the viewing window may include a first positioning of the viewing window at the first moment based on the first framing of the visual content, a second positioning of the viewing window at the second moment based on the second framing of the visual content, and/or other positioning of the viewing window based on other framing of the visual content.

In some implementations, the viewing path may include a cut transition between the first positioning of the viewing window at the first moment and the second positioning of the viewing window at the second moment. In some implementations, the viewing path may include a panning transition between the first positioning of the viewing window at the first moment and the second positioning of the viewing window at the second moment. In some implementations, the panning transition may include a change (increase, decrease) in playback rate for the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
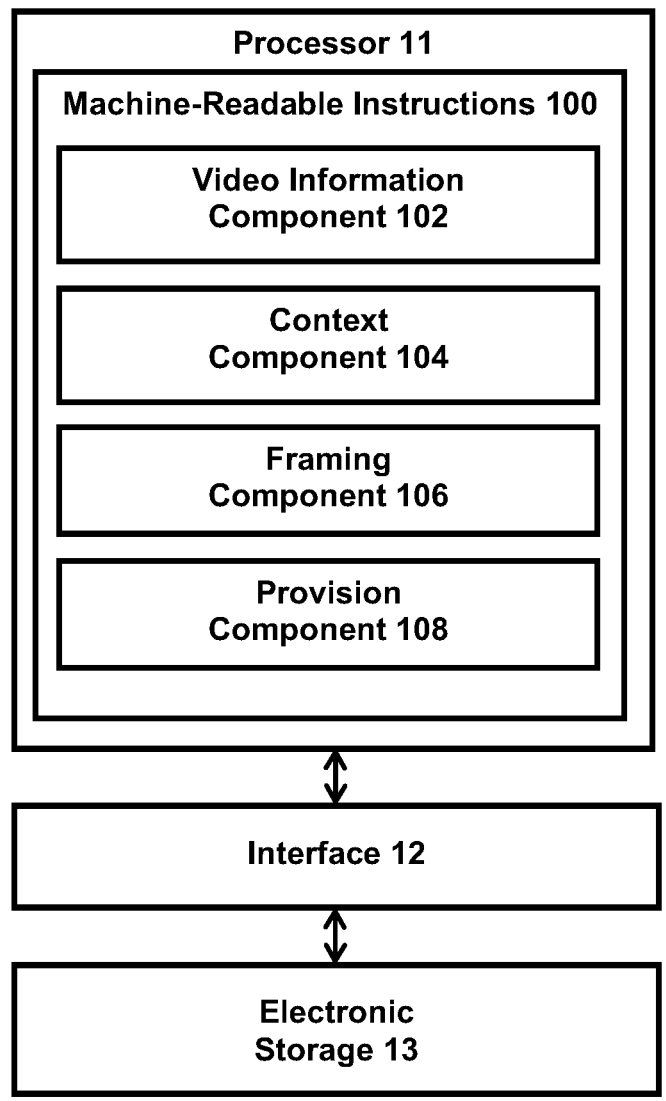
FIG. 1 illustrates an example system that suggest framing of videos.

FIG. 1 illustrates a system 10 for suggesting framing of videos. The system 10 may include one or more of a processor 11, an interface 12 (e.g., bus, wireless interface), an electronic storage 13, and/or other components. In some implementations, the system 10 may include one or more optical elements, one or more image sensors, one or more sound sensors, one or more position sensors, and/or other components. Video information defining a video and/or other information may be obtained by the processor 11. The video may include video content having a progress length. The video content may include visual content viewable as a function of progress through the progress length. The visual content may have a field of view. Context of the video content as the function of progress through the progress length may be assessed by the processor 11. A set of framing of the visual content at one or more moments within the progress length may be determined by the processor 11 based on the context of the video content and/or other information. An individual framing of the visual content may define a positioning of a viewing window within the field of view of the visual content at a corresponding moment within the progress length. The viewing window may define extents of the visual content to be included within a presentation of the video content. The set of framing of the visual content may be provided by the processor 11 for use in generating the presentation of the video content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video, information relating to visual content, information relating to context of video content, information relating to framing of visual content, information relating to a viewing window, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content may have a field of view. A field of view of visual content may refer to an extent of a scene captured and/or viewable within the visual content. A field of view of visual content may refer to a part of a scene from which light is received for generation of the visual content. For example, the video may include a wide field of view video, such as a spherical video defining visual content viewable from a point of view as a function of progress through the progress length, and the field of view may of the spherical video may include a spherical field of view (360 degrees of capture). Other wide field of view are contemplated. A field of view of visual content may be static (unchanging) or dynamic (changing). For example, a field of view of visual content of video content may change as a function of progress through the progress length of the video content. Other fields of view are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be consumed as virtual reality content. Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video content captured from a path taken by the image capture device(s) in the moving position. For example, spherical video content and/or virtual reality content may include video content captured by a spherical camera of a person walking around in a music festival.

Figure 3:
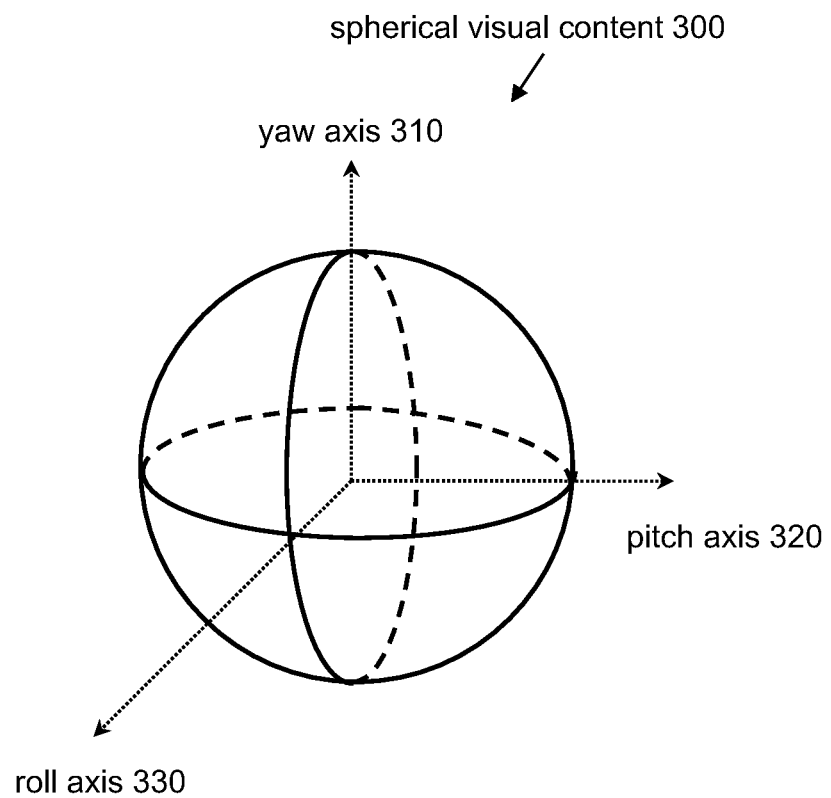
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content. For example, the visual content may include a field of view, and the punchout of the visual content may include the entire extent of the visual content (the visual content within the entire field of view) or one or more extents of the visual content (the visual content within one or more portions of the field of view.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
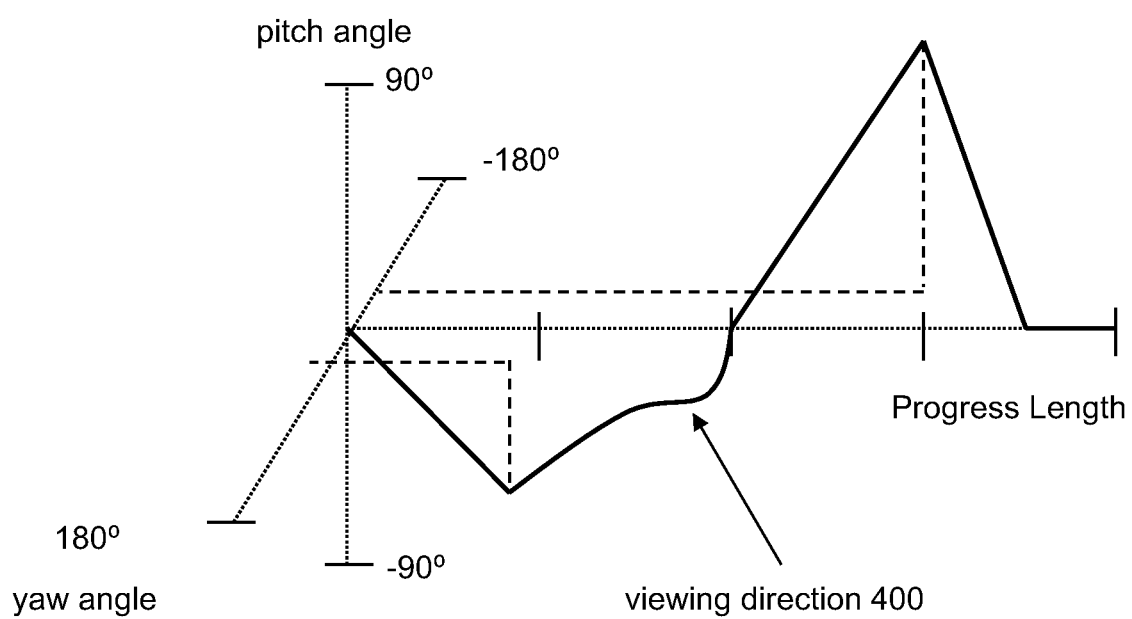
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figures 5A, 5B:
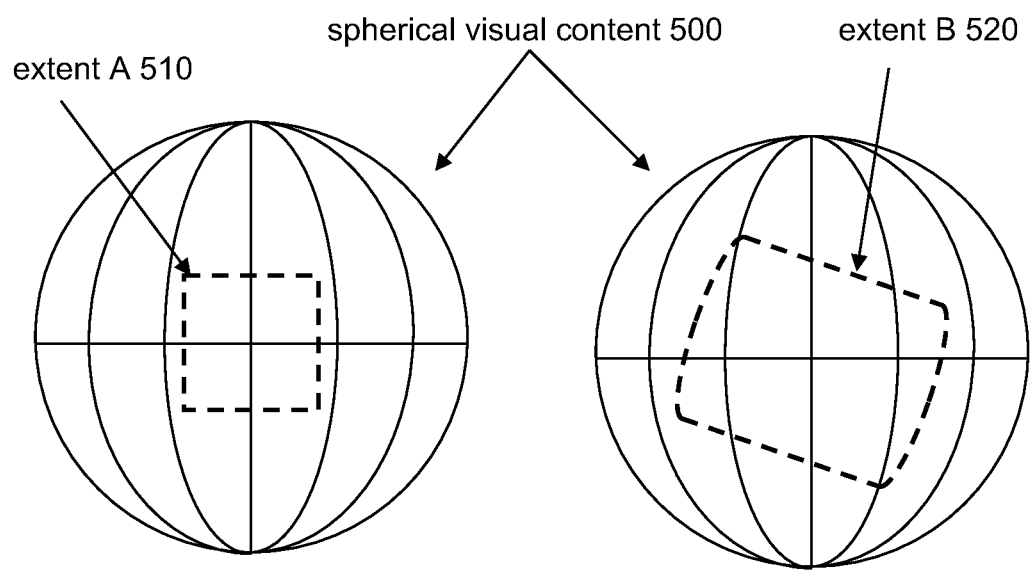
FIGS. 5A and 5B illustrate example extents of spherical visual content.

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

In some implementations, the viewing window may be characterized by a viewing projection. A viewing projection may define how pixels within the viewing window is arranged for presentation on a display. A viewing projection may define how the pixels of an image are arranged to form the visual content. A viewing projection may refer to how portions of the visual content/pixels are mapped onto a two-dimensional plane (e.g., two-dimensional image). For example, a viewing projection may arrange pixels of the image such that one or more visual elements (defined by one or more pixels) of the visual content are stretched (e.g., at the top or bottom of an image arranged using an equirectangular projection) or not stretched (e.g., middle of an image arranged using a rectilinear projection). Example viewing projections may include rectilinear projection, cylindrical projection, Mercator projection, Miller projection, Lambert projection, equirectangular projection, stereographic projection, fisheye projection, equisolid projection, orthographic projection, cubic projection, sinusoidal projection, transverse projection (rotation of a projection by 90 degrees), Panini projection, architectural projection, and/or other viewing projections.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

The sound(s) within the audio content may correspond to the sound(s) that were captured when capturing the visual content. For example, the visual content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include speech, singing, shouting, cheering, yelling, screaming, booing, and/or other voice.

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the visual information. In some implementations, audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or sound sensor(s), of the system 10 may be carried by the housing of the image capture device. The housing may carry other components, such as the processor 11 and/or the electronic storage 13.

Figure 6:
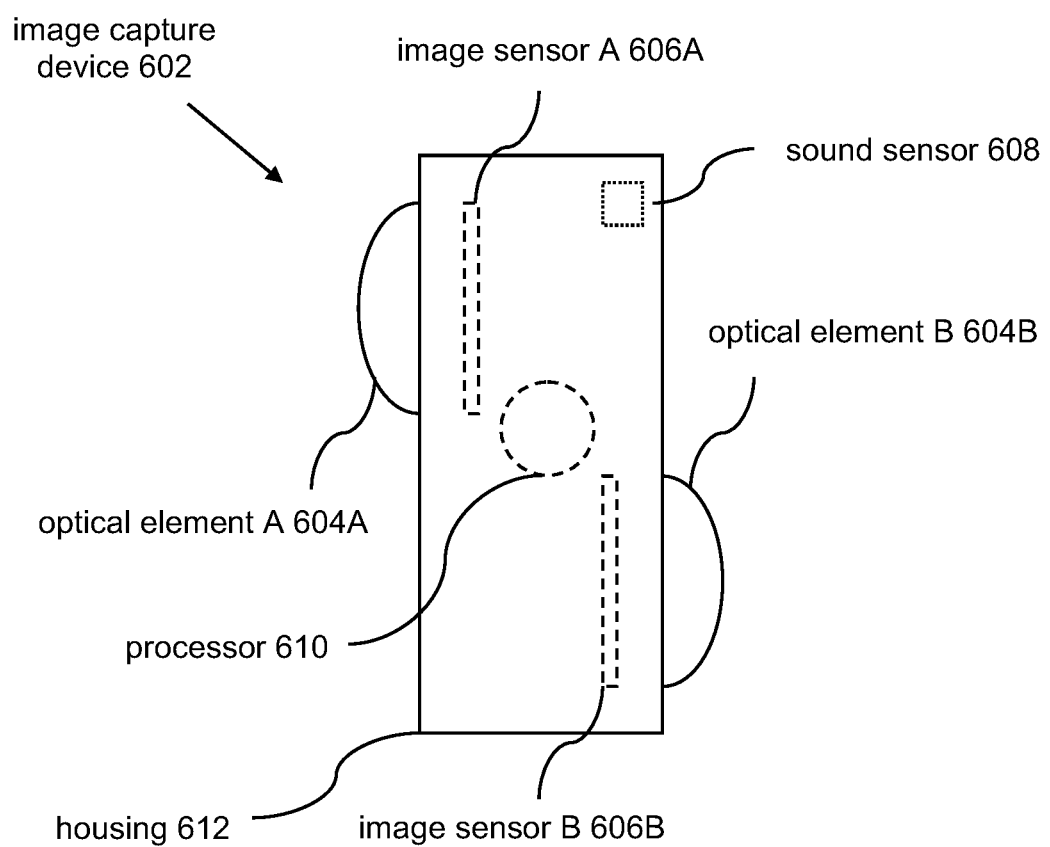
FIG. 6 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 6 illustrates an example image capture device 302. Visual content (e.g., of image(s), video frame(s)) may be captured by the image capture device 602. The image capture device 602 may include a housing 612. The housing 612 may refer a device (e.g., casing, shell) that covers, protects, and/or supports one or more components of the image capture device 602. The housing 612 may include a single-piece housing or a multi-piece housing. The housing 612 may carry (be attached to, support, hold, and/or otherwise carry) one or more of an optical element A 604A, an optical element B 604B, an image sensor A 606A, an image sensor B 606B, a sound sensor 608, a processor 610, and/or other components. In some implementations, an image capture device may include a non-spherical image capture device. Other configurations of image capture devices are contemplated.

One or more components of the image capture device 602 may be the same as, be similar to, and/or correspond to one or more components of the system 10. For example, he processor 610 may be the same as, be similar to, and/or correspond to the processor 11. The image capture device 602 may include other components not shown in FIG. 6. The image capture device 602 may not include one or more components shown in FIG. 6. Other configurations of image capture devices are contemplated.

The optical elements 604A, 604B may include instrument(s), tool(s), and/or medium that acts upon light passing through the instrument(s)/tool(s)/medium. For example, the optical elements 604A, 604B may include one or more of lens, mirror, prism, and/or other optical elements. The optical elements 604A, 604B may affect direction, deviation, and/or path of the light passing through the optical elements 604A, 604B. While the optical elements 604A, 604B are shown in a staggered configuration, this is merely an example.

The image sensors 606A, 606B may include sensor(s) that converts received light into output signals. The output signals may include electrical signals. The image sensors 606A, 606B may generate output signals conveying information that defines visual content of one or more images and/or one or more video frames of a video. For example, the image sensors 606A, 606B may include one or more of a charge-coupled device sensor, an active pixel sensor, a complementary metal-oxide semiconductor sensor, an N-type metal-oxide-semiconductor sensor, and/or other image sensors.

The image sensors 606A, 606B may be configured to generate output signals conveying visual information (defining visual content of images and/or videos) based on light that becomes incident thereon and/or other information. The optical element A 604A may be configured to guide light within a field of view to the image sensor A 606A, and the image sensor A 606A may be configured to generate output signals conveying visual information based on light that becomes incident thereon via the optical element A 604A. The optical element B 604B may be configured to guide light within a field of view to the image sensor B 606B, and the image sensor B 606B may be configured to generate output signals conveying visual information based on light that becomes incident thereon via the optical element B 604B. The fields of view of the optical elements 604A, 604B may refer to the extents of the observable world that is seen through the optical elements 604A, 604B. The field of views of the optical elements 604A, 604B may include one or more angles (e.g., vertical angle, horizontal angle, diagonal angle) at which light is received and passed on by the optical elements 604A, 604B. The fields of view of the optical elements 604A, 604B may be the same or different.

The fields of view of the optical elements 604A, 604B may be greater than or equal to 180-degrees. The optical elements 604A, 604B may be carried by the housing 312 such that peripheral portions of the fields of view of the optical elements 604A, 604B overlap. The overlap of the peripheral portions of the fields of view of the optical elements 604A, 604B may enable capture of spherical visual content (e.g., of images and/or videos) based on the visual information conveyed by the output signals of the image sensors 606A, 606B. That is, the overlap of the peripheral portions of the fields of view of the optical elements 604A, 604B may enable capture of spherical visual content based on visual content defined by the visual information of the image sensor A 606A (visual content captured by the image sensor A 606A) and visual content defined by the visual information of the image sensor B 606B (visual content captured by the image sensor B 606B). function of progress through the capture duration.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

The sound sensor 608 include sensor(s) (e.g., microphone, component(s) of microphone) that converts received sounds into output signals. The output signals may include electrical signals. The sound sensor 608 may generate output signals conveying information based on sounds received by the sound sensor 608. For example, sound sensor 608 may be configured to generate a sound output signal conveying audio information based on the received sounds. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats. The audio information may be stored in one or more locations, such as an electronic storage, storage of the sound sensor 608, remote storage, and/or other locations. While the sound sensor 608 is shown to be carried by the housing 612 in FIG. 6, this is merely an example and is not meant to be limiting. The sound sensor 608 may be remote/separate from the image capture device 602.

The sound sensor 608 may include multiple sound sensors (e.g., microphones), such as one or more arrays of sound sensors. The multiple sound sensors may be used to capture spatial sounds. Audio content captured by the sound sensors may include one or more spatial sounds. Spatial sounds may refer to sounds in which the spatial aspects of the sounds are preserved. Spatial sounds may refer to sounds (e.g., planar 360-sound) within audio content in which the direction of the sounds (e.g., direction from/in which the sound is traveling, spatial relativity of the sound origination to the sound sensor) has been recorded within the audio information (e.g., metadata for audio content). The spatial information relating to sounds within the audio content may be stored using spatial-sound techniques (e.g., surround sound). For example, audio content may include three-dimensional sound field (e.g., captured in Ambisonic format) and/or other spatial sounds. In some implementations, the spatial aspects of sounds may be captured using an array of sound sensors (e.g., using time difference of when sound is detected by individual sound sensors).

The audio information may characterize one or more directions of the sounds within audio content. A direction of a sound may refer to a direction from/in which the sound is traveling when captured by an audio capture device. A direction of a sound may indicate the source of the sound and the direction in which the sound is projected from the source of the sound. For example, the audio information may define three-dimensional sound field. Three-dimensional sound field may provide information on spherical surround sound. Particular channels of the audio content may be used to analyze sounds traveling in different directions and/or to analyze omni-directional sounds.

The processor 610 may include one or more processors (logic circuitry) that provide information processing capabilities in the image capture device 602. The processor 610 may provide one or more computing functions for the image capture device 602. The processor 610 may operate/send command signals to one or more components of the image capture device 602 to operate the image capture device 602. For example, the processor 610 may facilitate operation of the image capture device 602 in capturing image(s) and/or video(s), facilitate operation of the optical elements 604A, 604B (e.g., change how light is guided by the optical elements 604A, 604B), and/or facilitate operation of the image sensors 606A, 606B (e.g., change how the received light is converted into information that defines images/videos and/or how the images/videos are post-processed after capture).

The processor 610 may obtain information from the image sensors 606A, 606B and/or the sound sensor 608, and/or facilitate transfer of information from the image sensors 606A, 606B and/or the sound sensor 608 to another device/component. The processor 610 may be remote from the processor 11 or local to the processor 11. One or more portions of the processor 610 may be part of the processor 11 and/or one or more portions of the processor 11 may be part of the processor 610. The processor 610 may include and/or perform one or more functionalities of the processor 11 shown in FIG. 1.

Referring back to FIG. 1, the system 10 may be remote from an image capture device or local to the image capture device. One or more portions of an image capture device may be remote from or a part of the system 10. One or more portions of the system 10 may be remote from or a part of an image capture device. For example, one or more components of the system 10 may be carried by a housing, such as a housing of an image capture device. For instance, optical element(s), image sensor(s), the sound sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate suggesting framing of videos. The machine-readable instructions 100 may include one or more computer program components. The machine-readable instructions 100 may include one or more of video information component 102, a context component 104, a framing component 106, a provision component 108, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain information from a storage location, such as the electronic storage 13, electronic storage of information and/or signals generated by one or more sensors, electronic storage of a device accessible via a network, and/or other locations. The video information component 102 may obtain information from one or more hardware components (e.g., an image sensor, a sound sensor) and/or one or more software components (e.g., software running on a computing device).

Video information may be obtained during acquisition of the video and/or after acquisition of the video by one or more image capture devices. For example, the video information component 102 may obtain video information defining a video while the video is being captured by an image capture device. The video information component 102 may obtain video information defining a video after the video has been captured and stored in memory (e.g., the electronic storage 13).

In some implementations, the video information component 102 may obtain video information based on user interaction with a user interface/application (e.g., video editing application, video player application), and/or other information. For example, a user interface/application may provide option(s) for a user to select framing of videos. The video information defining the video(s) may be obtained based on the user's selection of the video(s) through the user interface/video application. Other selections of video for retrieval of video information are contemplated.

Video information may define a video (e.g., non-spherical video, spherical video, panoramic video). The video may include video content having a progress length. The video content may include visual content viewable as a function of progress through the progress length. The visual content may have a field of view. The video information may define a video by including information that defines one or more content, qualities, attributes, features, and/or other aspects of the video. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine content of audio for the video. Other types of video information are contemplated.

In some implementations, the video may include a spherical video. The field of view of the visual content may include a spherical field of view. Spherical field of view may include full spherical field of view (360 degrees of capture) or partial spherical field of view (less than 360 degrees of capture). The visual content may be viewable from a point of view as the function of progress through the progress length. A spherical video may include and/or may be associated with spatial sounds.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The context component 104 may be configured to assess context of the video content. The context of the video content may be assessed as the function of progress through the progress length. The context component 104 may assess context of the video content at different moments (points in time, time durations) within the progress length of the video content. Context of the video content may refer to circumstances and/or conditions of the setting and/or scene that is captured within the video content. Context of the video content may include circumstances and/or conditions of the image capture device during capture of the video content. Context of the video content may include circumstances and/or conditions of one or more scenes (e.g., things within field of view of the image capture device) that are captured within the video content. Other context of video content are contemplated.

Assessing context of the video content may include one or more of analyzing, calculating, determining, estimating, evaluating, examining, identifying, retrieving, reviewing, and/or otherwise assessing the context of the video content. Assessment of the content of the video content may include qualitative and/or quantitative assessment of the content of the video content. For example, the context component 104 may evaluate and/or estimate the nature of, quality of, and/or quantity reflecting the context of the video content.

Context of the video content may be assessed based on one or more of visual content analysis, audio content analysis, user input analysis, metadata analysis, and/or other information. Visual content analysis may refer to examination of the visual content, such as blur detection, color analysis, face recognition, histogram analysis, object recognition, background recognition, motion recognition, skeletal/pose estimation, activity recognition, scene recognition, salience detection, emotion recognition, and/or other visual content analysis. Audio content analysis may refer to examination of the audio content, such as sound detection, speech recognition, cheering recognition, voice recognition, command recognition, activity recognition, emotion detection, audio direction determination, and/or other audio content analysis. User input analysis may refer to examination of inputs provided by one or more users, such as user's quantitative and/or qualitative designation of the context of the video content (e.g., user classifying the context, user providing vales of parameters for classifying the context) and/or other user input analysis. Metadata analysis may include examination of metadata relating to the image capture device during capture of the video content, such as telemetry information, location (GPS) information, position information, speed information, velocity information, acceleration information, rotation information, and/or other information. Other assessment of the context of the video content are contemplated.

In some implementations, the context of the video content may include direction of audio content captured with the visual content. Direction of audio content may refer direction from which sounds within the audio content is traveling when captured, direction towards which sounds within the audio content is traveling when captured, the spatial relativity of sound origination to the sound sensor when captured, and/or other direction of audio content. The direction of audio content may be represented by one or more audio vectors. For example, the audio content may include recording of one or more voices captured during capture of the visual content, and the direction of the voice(s) may be represented by one or more audio vectors.

Figure 7:
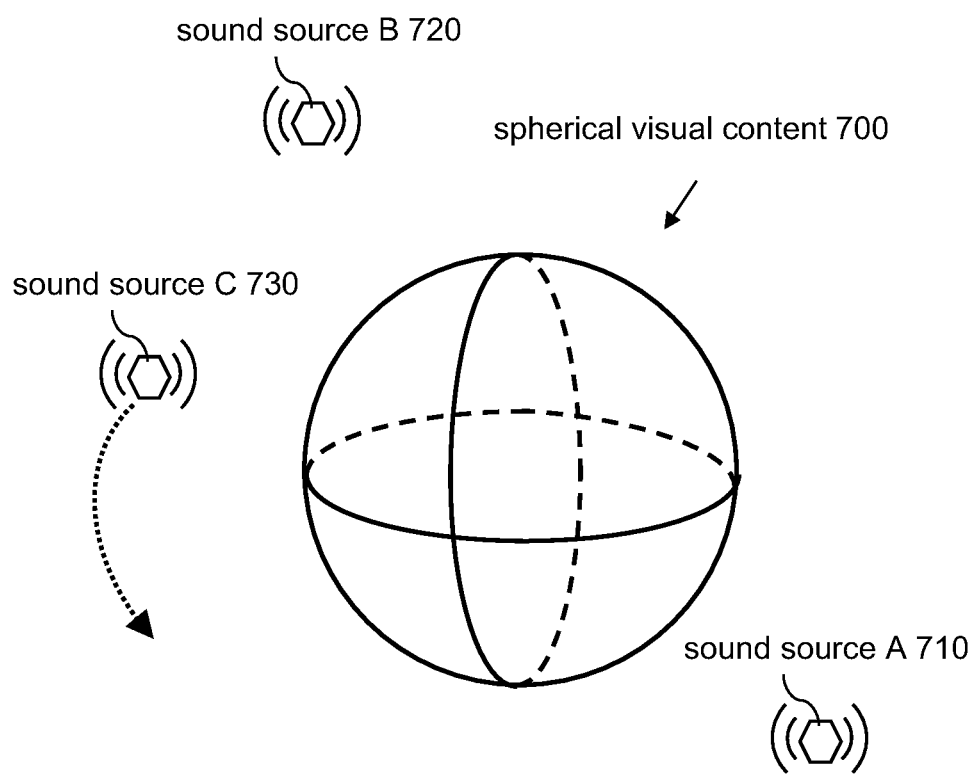
FIG. 7 illustrates example sound sources during capture of visual content.

FIG. 7 illustrates example sound sources 710, 720, 730 during capture of spherical visual content 700. The sound source A 710 may be located to the front, left, and below the capture location (e.g., location of image capture device capruing the spherical visual content 700) of the spherical visual content 700. The sound source B 720 may be located to the rear, right, and above the capture location. The sound source C 730 may be located to the right of the capture location, and may move from the rear to the front of the capture location. The sound sources 710, 720, 730 may generate sounds during capture of the spherical visual content 700, and the direction of the sounds may provide context for the visual content. Audio content captured based on sounds traveling from the sound sources 710, 720, 730 may include spatial sounds with their spatial relativity with respect to the spherical visual content 700 recorded within the audio information.

In some implementations, the context of the video content may include capture motion—motion of one or more image captures device that captured the visual content. The capture motion may include motion of the image capture device(s) at a time, over a duration of time, at a location, or over a range of locations. Motion of an image capture device may include linear (translational) and/or angular (rotational) motion of the image capture device. For example, capture motion may include one or more of position, change in position, linear speed, angular speed, linear acceleration, angular acceleration, linear direction, and/or angular direction of image capture device(s) during capture of the visual content. In some implementations, capture motion may include a direction of gravity on the image capture device(s) during visual content capture. The direction of gravity may indicate the motion of the image capture device(s) with respect to gravity during capture of the visual content (e.g., motion away from direction of gravity, motion towards direction of gravity). For instance, capture motion may include an image capture device being thrown during capture of the visual content. Other capture motions are contemplated.

In some implementations, the context of the video content may include content motion—motion of one or more things (e.g., living things, non-living things, persons, animal, objects, vehicles, machines) captured/depicted within the visual content. The content motion may include motion of the thing(s) at a time, over a duration of time, at a location, or over a range of locations. Motion of a thing may include linear (translational) and/or angular (rotational) motion of the thing. For example, content motion may include one or more of position, change in position, linear speed, angular speed, linear acceleration, angular acceleration, linear direction, and/or angular direction of thing(s) within field of view of image capture device(s) during capture of the visual content. In some implementations, content motion may include a direction of gravity on the image capture device(s) during visual content capture. The direction of gravity may indicate the motion of the thing(s) with respect to gravity during capture of the visual content (e.g., motion away from direction of gravity, motion towards direction of gravity). For instance, content motion may include a thing jumping or being thrown during capture of the visual content. Other content motions are contemplated.

In some implementations, the context of the video content may include different types of activity being captured. For example, the context of the video content may be assessed as being of an action type, an interview type, a setting type, a social type, and/or other types. An action type may refer to the context of the video content in which one or more actions (e.g., sports, activities) are captured. An action type context of the video content may indicate that action aspects of the video content (e.g., visual content, audio content) are of interest to users during playback of the video content. The context of the video content may be assessed as being of an action type based on one or more of user input indicating the action type, visual content including depiction of actions, audio content including sound recording indicative of actions, position information characterizing motion of the image capture device, and/or other information indicating that the action aspect of the video content is of interest to users.

An interview type may refer to the context of the video content in which people speaking to one another are captured. An interview type context of the video content may indicate that speaking aspects of the video content (e.g., who is speaking) are of interest to users during playback of the video content. The context of the video content may be assessed as being of an interview type based on one or more of user input indicating the interview type, visual content including depiction of persons speaking to one another, audio content including sound recording indicative of persons speaking to one another, and/or other information indicating that the interview aspect of the video content is of interest to users.

A setting type may refer to the context of the video content in which one or more settings (e.g., traveling, landmarks, sceneries) are captured. A setting type context of the video content may indicate that setting aspects of the video content (e.g., visual content, audio content) are of interest to users during playback of the video content. The context of the video content may be assessed as being of a setting type based on one or more of user input indicating the setting type, visual content including depiction of landmarks, sceneries, different locations, traveling equipment, and/or exhibits, location information indicating that the locations of the visual content capture reflects traveling by the user of the image capture device, audio content including sound recording indicative of traveling by the user, and/or other information indicating that the setting of the video content is of interest to users.

A social type may refer to the context of the video content which one or more social events (e.g., social setting/gathering) are captured. A social type context of the video content may indicate that social aspects of the video content (e.g., visual content, audio content) are of interest to users during playback of the video content. The context of the video content may be assessed as being of a social type based on one or more of user input indicating the social type, visual content including depiction of persons in a social event, audio content including sound recording indicative of a social event, and/or other information indicating that the social aspect of the video content is of interest to users.

The framing component 106 may be configured to determine a set of framing of the visual content at one or more moments within the progress length based on the context of the video content and/or other information. A set of framing of the visual content may include one or more framing of the visual content. The framing component 106 may determine different framing of the visual content at different moments within the progress length based on the context of the video content. For example, the framing component 106 may determine framing of the visual content at different moments within the progress length based on the context of the video content at the corresponding moments. The framing component 106 may determine a single framing or multiple framing of the visual content at a single moment (e.g., a point in time, a video frame, a duration of time, a grouping of adjacent video frames) within the visual content. Thus, context assessment of the video content may be used to automatically determine framing of the visual content. Different context of the video content may result in different framing of the visual content.

An individual framing of the visual content may define a positioning of a viewing window within the field of view of the visual content at a corresponding moment within the progress length. The viewing window may define extents of the visual content to be included within a presentation of the video content. Positioning of the viewing window within the field of view of the visual content may determine framing of the visual content. Inclusion of the extent(s) of the visual content defined by the viewing window within presentation of the visual content may effectuate framing of the visual content. The context of the video content may be used to determine the type and/or the style of framing to be used for the visual content of the video content. That is, the context of the video content may be used to determine which portion(s) of the visual content (e.g., images, video frames) should be presented during playback of the video content.

Positioning of the viewing window within the field of view of the visual content may refer to placement of the viewing window within the field of view of the visual content. In some implementations, an individual framing of the visual content may define a positioning of the viewing window within the field of view of the visual content based on a viewing direction, a viewing size, a viewing rotation, and/or other information. Individual framings of the visual content may define positionings of the viewing window within the field of view of the visual content based on the corresponding viewing direction, viewing size, viewing rotation, and/or other information. An individual framing of the visual content may define arrangement of pixels within the viewing window for presentation. The arrangement of the pixels within the viewing window may be defined by viewing projection and/or other information. Individual framings of the visual content may further define corresponding viewing projections of the visual content within the viewing window.

Figure 8C:
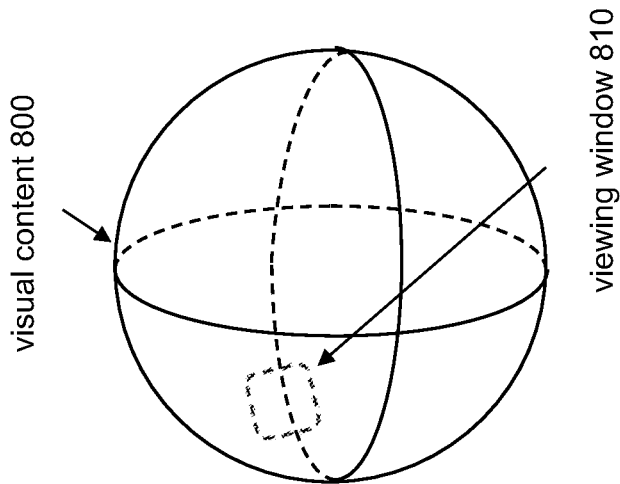
FIGS. 8A, 8B, and 8C illustrate example framing of visual content.
Figure 8B:
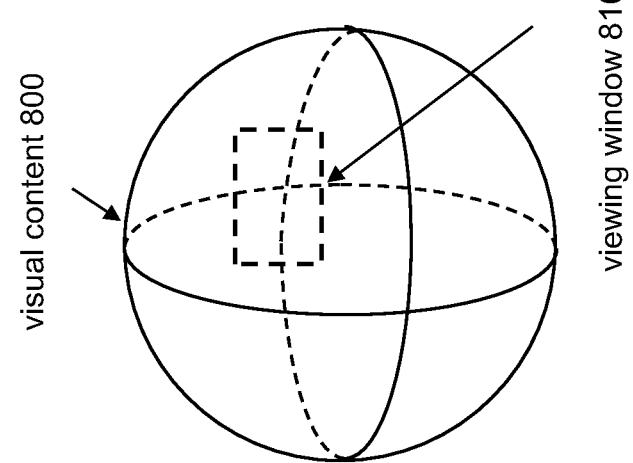
Figure 8A:
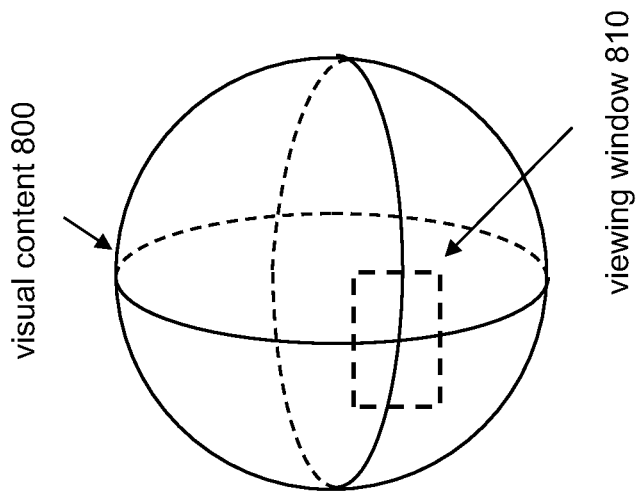

For example, FIGS. 8A, 8B, and 8C illustrate different framing of visual content 800 at different moments within the progress length of the visual content 800. For instance, the visual content 800 may include visual content of a video, and FIGS. 8A, 8B, and 8C may illustrate the visual content 800 within different video frames of the video (content of the video frames at different moments within the progress length). For example, as shown in FIG. 8A, a framing of the visual content 800 at a first moment within the progress length may include a viewing window 810 being positioned at the front of the visual content 800 and being leveled within the visual content 800. As shown in FIG. 8B, a framing of the visual content 800 at a second moment (subsequent to the first moment) within the progress length may include the viewing window 810 being positioned at the back of the visual content 800 and being leveled within the visual content 800. As shown in FIG. 8C, a framing of the visual content 800 at a third moment (subsequent to the second moment) within the progress length may include the viewing window 810 being positioned at front-upper-right of the visual content 800. The framing of the visual content 800 at the third moment may include the viewing window

810 being tilted and having a different dimension (e.g., different shape, smaller size) than the framing of the visual content at the first moment and the second moment. Other framings of the visual content are contemplated.

In some implementations, framing of visual content may include a moment-to-duration framing. A moment-to-duration framing may refer to a framing that changes the progress length of the video/visual content. For example, a moment-to-duration framing may extend a moment (e.g., point in time, duration of time) within the progress length to a duration longer than the moment within the progress length/presentation of the video content. For example, a moment-to-duration framing may include visual content at a point within the progress length that has been duplicated over a duration longer than the point. For instance, a video frame corresponding to the moment-to-duration framing may be duplicated into multiple video frames so that the same content within the video frame is presented during the duration corresponding to the moment-to-duration framing.

As another example, a moment-to-duration framing may include a video segment with the playback rate and/or playback direction defined by the moment-to-duration framing. For instance, video frames corresponding to the moment-to-duration framing may be played back at a playback rate different (e.g., faster, slower) than the normal playback rate (1× speed) and/or the order/direction in which the video frames are presented may be changed (e.g., forward playback direction, reverse playback direction).

In some implementations, a moment-to-duration framing may include multiple sub-framings within the duration of the moment-to-duration framing. A sub-framing may refer to a framing within the duration of the moment-to-duration framing. The multiple sub-framings within the duration may enable different portions of the visual content corresponding to the duration to be included within a presentation of the visual content. For example, for a moment-to-duration framing that extend a moment (e.g., point in time, duration of time) within the progress length to a duration longer than the moment within the progress length/presentation of the video content, multiple sub-framings may simulate the video being paused for the duration and different portions of the visual content being presented while the video is paused.

Figure 8D:
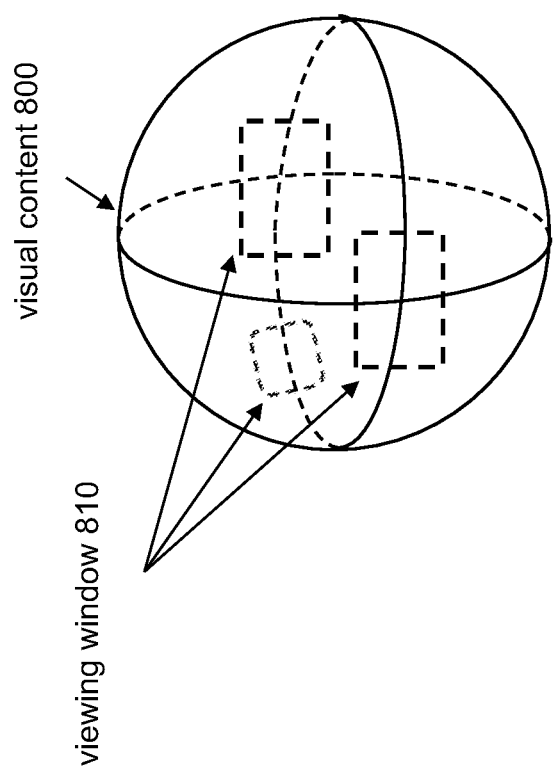
FIG. 8D illustrate an example moment-to-duration framing of visual content.

FIG. 8D illustrate an example moment-to-duration framing of visual content 800. The visual content 800 may corresponds to visual content of a video at a moment (e.g., a point in time) within the progress length of the video. For example, the visual content 800 may be visual content of a video frame within the video. The moment-to-duration framing of the visual content 800 may extend the moment within the progress length to a duration longer than the moment within the progress length/presentation of the video content. The moment-to-duration framing of the visual content 800 may include the visual content 800 being duplicated over the duration (the video frame being duplicated to extend the duration) so that the presentation of the video appears to be paused during playback of the duration. The moment-to-duration framing of the visual content 800 may include multiple sub-framings within the duration. For example, as shown in FIG. 8D, the moment-to-duration framing of the visual content 800 may include three sub-framings within the duration. For instance, the multiple sub-framings of the visual content 800 may include the viewing window 810 being positioned (1) at the front of the visual content 800 and being leveled within the visual content 800 at the beginning of the duration, (2) at the back of the visual content 800 and being leveled within the visual content 800 within the duration (e.g., at the mid-point, at non-midpoint), and (3) at front-upper-right of the visual content 800 and being tiled and having a different dimension at the end of the duration. Other sub-framings of the visual content are contemplated.

In some implementations, the set of framing of the visual content may be determined based on one or more of direction of audio content captured with the visual content, capture motion, content motion, types of activity captured, and/or other information. Different context of the video content may be associated with different criteria for determining framing of visual content. For example, criteria for determining framing of visual content based on direction of audio content may be different from criteria for determining framing of visual content based on motion, which may be different from criteria for determining framing of visual content for visual content associated with a particular type of activity.

For example, criteria for determining framing of visual content associated with a setting type context may provide information (e.g., rules, standards, logic) on the use of scene/landmark detection to frame the visual content. The framing of the visual content may use one or more recognitions within the visual content to provide views of interesting scenes. In some implementations, the framing of visual content may use one or more projections (e.g., stereographic projection to provide little planet view, reverse little planet view) and/or rolling of the visual content to create dynamic views of traveling scenes, landmarks, sceneries, and/or other depictions that emphasize setting aspects of the visual content.

Criteria for determining framing of visual content associated with a social type context may provide information (e.g., rules, standards, logic) on use of viewing window placements to focus on social aspects of the visual content. The viewing window placements may use one or more recognitions within the visual content to provide interesting views of the captured visual content that focus on social aspects of the visual content. The locations and/or sizes of the viewing window may be determined to include faces, particular faces (e.g., using face recognition to detect locations of particular persons in a crowded scene and panning the viewing window between particular persons), particular perspective of faces, particular emotions (e.g., preferring smiling faces over neutral faces), particular motion (e.g., using motion recognition and/or skeletal/pose estimation to detect interesting movement being performed by person(s)), and/or other views of individuals.

In some implementations, criteria for determining framing of visual content associated with a social type context may provide different information based on specific social type context. For example, different rules may be provided for determining framing visual content captured during a selfie mode than for visual content captured during interaction of multiple persons. For example, viewing window for visual content captured during a selfie mode may be determined to include a view of the person using the image capture device (selfie-view) and/or a view of the scene that is being looked at by the user (perspective-view).

For instance, location of viewing windows for visual content captured during a selfie mode may be determined based on the gaze of the user in the selfie-view. A user's gaze may refer to how a user of the image capture device is looking at something, such as whether the user is looking at a particular object and/or an event steadily (e.g., the user is looking at an object or an event for a threshold amount of time). A user's gaze may be characterized by one or more directions in which the user is looking. The direction(s) in which the user is looking may correspond to viewing direction(s) for visual content (e.g., spherical visual content). A user's gaze may be determined based on analysis of one or more body parts of the user. For example, a user's gaze may be determined based on visual analysis of the location/orientation of the user's eyes, the user's iris, the user's nose, the user's head, and/or other parts of the user's head. The determination of user's gaze may be facilitated through use of other information about the user, such as information on the user's body pose (e.g., the user extending a hand/finger in a particular direction), information on the user's vocal cues about locations of interest (e.g., the user stating whether the location of interest is in front, to the left, to the right, behind, above, or below the user), and/or other information.

As another example, framing of visual content may be determined based on capture motion (motion of the image capture device), content motion, and/or other information. Such framing of visual content may enable a user to capture video without worrying about which direction in which the image capture device is pointed. For instance, framing of visual content may be determined to follow the motion of the image capture device. Direction of motion may include direction of motion of the image capture device and/or direction of a thing (e.g., person, vehicle, object) carrying the image capture device. The direction of motion may be determined based on visual analysis of the visual content (e.g., using optical flow to determine the direction of motion), based on non-image sensor information (e.g., information generated by one or more of an accelerometer, gyroscope, magnetometer, inertial measurement unit, GPS unit), and/or other information. The framing of visual content may change to automatically follow the motion of the image capture device, and provide a forward motion view of the visual content. Framing of visual content may be determined to follow motion of one or more things depicted within the visual content. The framing of the visual content may change to automatically follow the object, and provide a tracking view of the visual content.

As yet another example, framing of visual content captured during an interaction of multiple persons may be determined to include views of the multiple persons. For instance, location of viewing windows for visual content captured during an interaction of multiple persons (e.g., interview mode, social mode) may be determined to include views of active participants (e.g., speakers, performers). The viewing window may be located within the field of view of the visual content to include one or more framings of the active participants. For example, the interaction of multiple persons may include an exchange of speech (e.g., interview) between two persons, and the viewing windows may be positioned to frame the two persons. Framing of visual content may be determined to include a particular framing of a subject/person (e.g., zoomed in on the face, centering face within the viewing window, off-centering face within the viewing window, including one or more portions of the body, position of the body within the viewing window). Framing of different persons may be made consistent so that the different persons are presented in the same perspective or similar perspectives within the framing of visual content. As another example, the interaction of multiple persons may include a presentation of information by a speaker to a crowd of persons, and the viewing window may be positioned to frame the active participants (e.g., speaker, audience member(s) asking questions), the non-active participants (e.g., audience) and/or the presented information (e.g., screen displaying presented information).

The direction of sound/voice may be used to determine which person (e.g., interviewer, interviewee, speaker, audience) is speaking and the framing of the visual content may be determined/changed based on who is speaking to include the depiction of the person speaking. In some implementations, framing of visual content may be determined based on the audio vector(s) representing direction of voice(s), and/or other information. For example, audio vector(s) may be derived from Ambisonic audio track, and the audio vectors may be used to determine where the viewing window should be positioned to frame the speaker within the viewing window. For instance, a spherical image capture device may capture visual content depicting spherical environment, and audio may be captured using multiple microphones. To render the visual content in a two-dimensional format, a viewing window may be used to punchout different extents of the visual content. Change in position of the viewing window may provide for transition in the presentation. For example, the position of the viewing window may change based on who is speaking, enabling the presentation to automatically frame the person speaking and automatically generating video transitions when the viewing window switches between different speakers. Thus, transition between different framing of the visual content may be determined based on change in active speaker. Other criteria for determining framing of visual content are contemplated.

In some implementations, audio content may be analyzed to identify occurrence of one or more highlight events within the video content. Highlight events may refer to events of interest captured within the video content. Highlight events may be general (same criteria used to identify highlight events for different persons) or applicable to specific persons (different criteria used to identify highlight events for specific persons). Audio content may be analyzed to identify temporal and spatial aspect of highlight event(s). Temporal aspect of a highlight event may include temporal relationship between sounds that indicate occurrence of a highlight event and the highlight event itself. For example, the temporal aspect of the highlight event may indicate whether the highlight event occurs before, with, and/or after the sounds that indicate the occurrence of the highlight event. The temporal aspect of the highlight event may be used to determine the moment in the progress length for which the framing of visual content is determined. For example, a sound indicating occurrence of a highlight event may be recorded at a minute mark. The temporal aspect of the highlight event may indicate whether the highlight event occurred before the minute mark/how much before the minute mark, at the minute mark, and/or after the minute mark/how much after the minute mark.

For example, sound of "Did you see that?" may indicate that a highlight event occurred before the sound. Sound of people cheering, screaming, and/or laughing may indicate that a highlight event occurred with the sound. Sound of "Watch this" may indicate that a highlight event occurred after the sound. In some implementations, the amount of time between the occurrence of highlight events and sounds may depend on the type of the event. For example, the timing of temporal alignment between the highlight event and sound for a fast action event may be shorter than the timing of temporal alignment for a slow action event. The timing of temporal alignment between the highlight event and the sound for a particular event/type of event may be shorter/longer than the timing of temporal alignment for another event/type of event. Other temporal aspects are contemplated.

Spatial aspect of a highlight event may include spatial relationship between sounds that indicate occurrence of a highlight event and the highlight event itself. For example, the spatial aspect of the highlight event may indicate where within the field of view of the visual content the highlight event is depicted with respect to the direction of the sound (e.g., direction from which the sound is traveling, direction in which the sound is traveling). The spatial aspect of the highlight event may be used to determine the extent of the visual content to be included within the framing of visual content. For example, sound may originate from a highlight event, and the framing of the visual content may be determined to be pointed in the direction of the sound source (e.g., reverse of the direction of the sound). As another example, sound may be directed towards the highlight event (e.g., people cheering while looking at the highlighted event), and the framing of the visual content may be determined to be pointed in the direction in which the sound is traveling.

In some implementations, temporal and/or spatial aspect of the highlight event may be used to localize additional analysis of the video content. For example, the temporal aspect of the highlight event may be used to estimate a portion of the progress length to be analyzed. Spatial aspect of the highlight event may be used to estimate an extent of the field of view during the portion of the progress length to be analyzed. Analysis of the narrowed temporal and/or spatial extent of the video content may be used to determine framing of visual content. Thus, the temporal and/or spatial aspect of the highlight event may be used to temporally and/or spatially narrow the amount of video content to be analyzed (e.g., visual analysis, audio analysis, metadata analysis) for visual content framing determination. Such localization of analysis may provide for resource savings compared to performing analysis for entire temporal and spatial extent of the video content.

The provision component 108 may be configured to provide the set of framing of the visual content for use in generating the presentation of the video content. Generating the presentation of the video content may include determining which spatial extent of the visual content are included in the presentation based on the set of framing of the visual content. A presentation of the video content may include the extents of the visual content within the viewing window corresponding to the framing of the visual content. In some implementations, the extents of the visual content within the viewing window may be used to generate a two-dimensional video a spherical video.

Providing framing of visual content for use in generating the presentation of the video content may include one or more of supplying the framing for use in generating the presentation, making the framing available for generating the presentation, indicating the framing available for generating the presentation, presenting the framing for user selection/non-selection in generating the presentation, using the framing to generate the presentation, and/or otherwise providing the framing for use in generating the presentation of the video content. For example, framing of the visual content may be provided to a computing device, software, and/or user for use in generating the presentation of the video content. Framing of the visual content may be made available to a computing device, software, and/or user for generating the presentation. Which framing of the visual content are available for generating the presentation may be indicated to a computing device, software, and/or user. Framing of the visual content may be presented on one or more user interfaces for user selection or non-selected of the presented framing in generating the presentation.

For example, the framing of the visual content may be provided to a video player, and the video player may use the framing of the visual content to determine which extent of the visual content is included within the presentation of the video content. For instance, the video may include a spherical video, and the framing of the visual content may be used to provide a two-dimensional punchout view of the extent of the spherical video within the framing. In some implementations, one or more transitions in the presentation may be generated based on the framing of the visual content. A transition may refer to joining between two non-adjacent portion (spatial portions, temporal portions) of the video. A transition may be generated based on change in which of the framing is currently being used in the presentation. Change from one framing to another framing may simulate switching video feed between cameras pointed in different directions.

Figure 9:
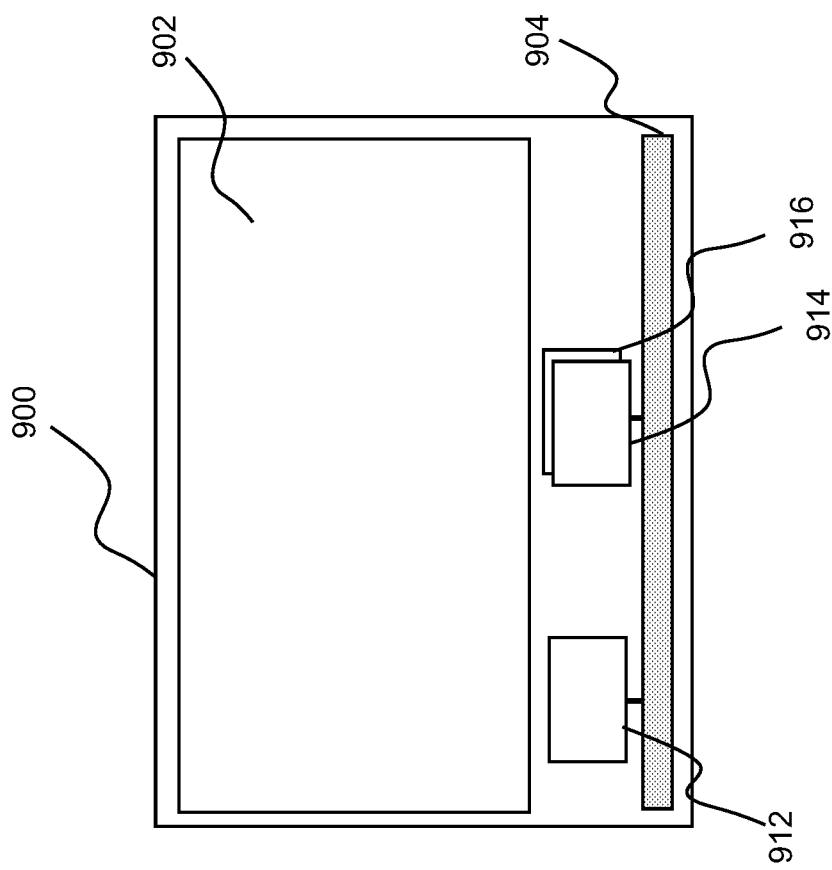
FIG. 9 illustrates an example interface for providing framing of visual content for use in generating a presentation.

FIG. 9 illustrates an example interface 900 for providing framing of visual content for use in generating a presentation. The interface 900 is provided as an example and is not meant to be limited. The interface 900 may include a playback section 902. The playback section 902 may present a playback of the visual content, with the extent of the visual content within the viewing window being punched out for the playback. The interface 900 may include a bar 904 that represents the progress length of the video content. Framing of visual content may be presented within boxes 912, 914, 916. The boxes 912, 914, 916 may represent three different framing determined for the visual content. The location of the boxes 912, 914, 916 along the bar 904 may represent the moment corresponding to the framing. For example, the box 912 may represent one framing determined for one moment within the progress length and the boxes 914, 916 may represent two framing determined for another moment within the progress length.

In some implementations, the boxes 912, 914, 916 may provide a preview of the presentation that would be generated in using the corresponding framing. For example, the boxes 912, 914, 916 may include a static depiction (preview image) of the extent of the visual content that will be included within the presentation at the corresponding moment based on the framing. The boxes 912, 914, 916 may include a dynamic depiction (preview video clip) of the extent of the visual content what will be included within the corresponding moment and/or around the corresponding moment based on the framing.

A user may interact with the interface 900 to select one or more of the framing for use in generating the presentation of the video content. For example, the user may select the framing represented by the box 912 so that the presentation will include the extent of the visual content within the corresponding viewing window. The user may select among the framing represented by the box 914 or the framing represented by the box 916 so that the presentation will include the extent of the visual content within the viewing window corresponding to the selected framing. The user may select multiple framing for the same moment within the progress length to include a moment-to-duration framing within the presentation.

In some implementation, the interface 900 may visually indicate which of the framing have or have not been selected for use in generating the presentation. For example, boxes representing selected framing may be shown differently (e.g., in different color, in different shape, with different intensity, at different location) than boxes representing non-selected framing.

In some implementations, use of multiple framing of visual content in generating the presentation of video content may include determining a viewing path for the viewing window between different moments corresponding to the multiple framing. A viewing path may refer to a path or a progression of the positioning of the viewing window within the field of view of the visual content as the function of progress through the progress length. A viewing path may define the positioning of the viewing window within the field of view of the visual content as the function of progress through the progress length. The positioning of the viewing window defined by the viewing path may include the positioning of the viewing window defined by the multiple framings of the visual content. Different framings of the visual content at different moments within the process length may dictate the positioning of the viewing window defined by the viewing path. Different framings of the visual content at different moment within the process length may define fixed positionings of the viewing window within the viewing path. The viewing path may be determined to include the fixed positionings of the viewing window within the viewing path. The viewing path may be determined to include changes in the positioning of the viewing window between the fixed positionings of the viewing window within the viewing path.

For example, the multiple framings of the visual content may include a first framing of the visual content at a first moment within the progress length and a second framing of the visual content at a second moment within the progress length, and the positioning of the viewing window defined by the viewing path may include a first positioning of the viewing window at the first moment based on the first framing of the visual content, a second positioning of the viewing window at the second moment based on the second framing of the visual content, and/or other positioning of the viewing window based on other framing of the visual content. Such determination of the viewing path may enable determination of a path through the visual content that takes into account the multiple framings of the visual content. For instance, the multiple framings may reflect a user's intended spatial and temporal positioning of the viewing window for a spherical video and the viewing path may define a path on the sphere that takes into account the user's designations (e.g., markers) that reflect which portions of the spherical video should be presented during playback.

In some implementations, determination of a viewing path for the video based on the framing information may include determination of changes in the positioning of the viewing window within the field of view of the visual content based on the multiple framings of the visual content at multiple moments within the progress length and/or other information. The viewing path may be determined by determining how the positioning of the viewing window should change between adjacent framings of the visual content (framings of the visual content that are next to each other in the progress length). The viewing path may include viewing path segments for individual pairs of adjacent framings, and the viewing path segments may be determined based on the corresponding pairs of adjacent framings.

Changes in the viewing direction as the function of progress through the progress length may effectuate movement (e.g., panning) of the viewing window within the field of view of the visual content. Changes in the viewing size (sizes of the viewing window) as the function of progress through the progress length may simulate changes in zoom of the visual content. The viewing size may be increased to simulate decrease in zoom of the visual content. The viewing size may be decreased to simulate increase in zoom of the visual content. Changes in the viewing rotation as the function of progress through the progress length may effectuate rotation of the viewing window within the field of view of the visual content. The viewing window may be rotated to compensate for rotation of the image capture device during capture duration. The viewing window may be rotated to provide tilted view of the visual content.

Figures 10A, 10B:
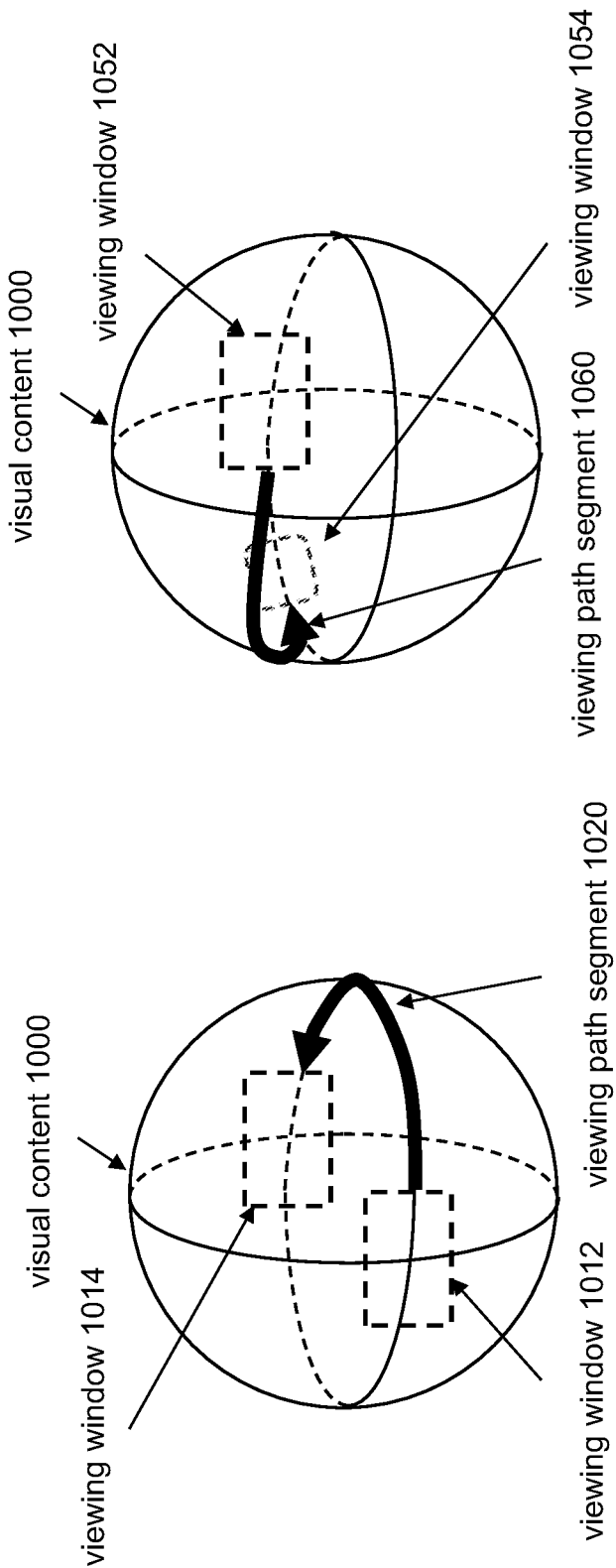
FIGS. 10A and 10B illustrate example viewing path segments determined based on multiple framing of visual content.

FIGS. 10A and 10B illustrate example viewing path segments 1020, 1060 determined based on multiple framing of visual content. The viewing paths segment 1020, 1060 may be determined based on the framings of the visual content 800 shown in FIGS. 8A, 8B, and 8C. The framings of the visual content 800 shown in FIGS. 8A, 8B, and 8C may define fixed positionings of the viewing window 810 for the visual content 800 at different moment within the progress length of the visual content 800. The viewing path for the visual content may be determined to include the viewing path segment 1020, 1060.

The adjacent framings shown in FIGS. 8A and 8B may be used to determine the viewing path segment 1020. Adjacent framings of the visual content may define fixed positionings of the viewing window within the viewing path at their corresponding moments (at the first moment and the second moment). The viewing path segment 1020 may be determined to include the fixed positionings of the viewing window within the viewing path so that the viewing path segment 1020 starts (at the first moment) with the viewing window 810 positioned at the front of the visual content 800 and being leveled within the visual content 800 and ends (at the second moment) with the viewing window 810 positioned at the back of the visual content 800 and being leveled within the visual content 800.

The viewing path segment 1020 may be determined to include changes in the positioning of the viewing window between the fixed positionings of the viewing window within the viewing path segment 1020 so that one or more of the viewing direction, the viewing size, the viewing rotation, and/or the viewing projection for the viewing window 810 changes from the being positioned at the front of the visual content 800 and being leveled within the visual content 800 to being positioned at the back of the visual content 800 and being leveled within the visual content 800. For instance, in FIG. 10A, the viewing path segment 1020 may include changes in the viewing direction of the viewing window 810 from being pointed in the front of the sphere to the back of the sphere.

The adjacent framings shown in FIGS. 8B and 8C may be used to determine the viewing path segment 1060. Adjacent framings of the visual content may define fixed positionings of the viewing window within the viewing path at their corresponding moments (at the second moment and the third moment). The viewing path segment 1060 may be determined to include the fixed positionings of the viewing window within the viewing path so that the viewing path segment 1060 starts (at the second moment) with the viewing window 810 positioned at the back of the visual content 800 and being leveled within the visual content 800 and ends (at the third moment) with the viewing window 810 positioned at front-upper-right of the visual content 800, being tilted, and having a different dimension (e.g., different shape, smaller size) than the positioning of the visual content at the first moment and the second moment.

The viewing path segment 1060 may be determined to include changes in the positioning of the viewing window between the fixed positionings of the viewing window within the viewing path segment 1060 so that one or more of the viewing direction, the viewing size, the viewing rotation, and/or the viewing projection for the viewing window 810 changes from the being positioned at the back of the visual content 800 and being leveled within the visual content 800 and ends with the viewing window 810 positioned at front-upper-right of the visual content 800, being tilted, and having a different dimension. For instance, in FIG. 10B, the viewing path segment 1060 may include changes in the viewing direction of the viewing window 810 from being pointed to the back of the sphere to the front-upper-right of the sphere. The viewing path segment 1060 may include changes in the viewing size of the viewing window 810 from being rectangular in shape to be a smaller square in shape. The viewing path segment 1060 may include changes in the viewing rotation of the viewing window 810 from being leveled to being tilted. In some implementations, viewing rotations of the fixed positioning of the viewing window may be ignored and the viewing window may be leveled (with respect to horizon) to provide a leveled view of the visual content. The viewing path segment 1060 may include changes in the viewing projection of the viewing window 810 from one type of viewing projection to another type of viewing projection. Other changes in the positioning of the viewing window are contemplated.

One or more types of interpolations may be used to determine changes in the positioning of the viewing window between fixed positionings of the viewing window within the viewing path. For example, a linear interpolation may be used to determine changes in the positioning of the viewing window along the viewing path segment 1020 so that the viewing direction changes linearly (the same amount of change in viewing direction for the same amount of the progress length) from being pointed to the front of the sphere to the back of the sphere. A non-linear interpolation may be used to determine changes in the positioning of the viewing window along the viewing path segment 1060 so that the viewing direction changes non-linearly (different amount of change in viewing direction for the same amount of the progress length) from being pointed to the back of the sphere to the front-upper-right of the sphere. For instance, an S-type non-linear curve may be used for non-linear interpolation so there are (1) smaller changes in the viewing direction in the beginning and the end of the viewing path segment 1060 and (2) larger changes in the viewing direction in the middle of the viewing path segment 1060, or vice versa. Other types of non-linear interpolation for changes in the positioning of the viewing window are contemplated.

In some implementations, a viewing path and/or a viewing path segment may be presented on one or more interfaces, such as a user interface. The user interface may enable a user to see the viewing path and/or viewing path segments for generating a presentation of the video content. The user interface may enable a user to change the viewing path and/or viewing path segments for generating a presentation of the video content. For example, the user interface may enable a user to change the viewing direction, the viewing size, the viewing rotation, and/or the viewing projection of a viewing path/viewing path segment.

In some implementations, the viewing path may include one or more cut transitions between different position of the viewing window at different moments. A cut transition may refer to change in position of the viewing window from a beginning location to an ending location without intermediate location. For example, referring to FIG. 10A, a cut transition between the front position of the viewing window 1012 at an initial moment and the back position of the viewing window 1014 at a later moment may include the viewing window being located at the front position at the initial moment and then being located at the back position at the later moment.

In some implementations, the viewing path may include one or more panning transitions between different position of the viewing window at different moments. A panning transition may refer to change in position of the viewing window from a beginning location to an ending location with intermediate locations. The intermediate locations may include locations of the viewing window as it moves across the visual content (e.g., across surface of spherical visual content). For example, referring to FIG. 10A, a panning transition between the front position of the viewing window 1012 at an initial moment and the back position of the viewing window 1014 at a later moment may include the viewing window being located at the front position at the initial moment, then moving along the viewing path segment 102 between the initial moment and the later moment, and then being located at the back position at the later moment.

In some implementations, a panning transition may include a change in playback rate for the visual content. A change in playback rate for the visual content may include decrease and/or increase in the playback rate from the normal rate of playback. For example, referring to FIG. 10A, when the viewing window is moving from the front position to the back position, a panning transition without a change in playback rate may move with the visual content being playback at 1× speed. When two adjacent framing are close to each other in the progress length, the panning transition without a change in playback rate may occur quickly. When two adjacent framing are far from each other in the progress length, the panning transition without a change in playback rate may occur slowly. For example, for two adjacent framing that are located a minute apart in the progress length, the panning transition that moves the viewing window from one framing position to the next framing position may take a minute of playback.

A panning transition with a change in playback rate for visual content may enable control of how quickly the viewing window switches from one framing position to another framing position and how quickly the visual content is played back during the transition. For example, for two adjacent framing that are far from each other in the progress length, it may be desirable to move quickly between the two framing positions. For instance, for two adjacent framing that are located one minute apart in the progress length, it may be desirable to move from one framing position (e.g., at 1-minute mark) to the next framing position (e.g., at 2-minute mark) at faster speed so that the transition takes less than a minute. To do so, the playback rate may be increased during the transition. That is, the perceived speed of playback of the video may be increased during the transition so that the presentation moves more quickly between the adjacent framing than with normal playback rate.

As another example, for two adjacent framing that are far from each other in the progress length, it may be desirable to move slowly between the two framing positions. For instance, for two adjacent framing that are located a one second apart in the progress length, it may be desirable to move from one framing position (e.g., at 1-minute mark) to the next framing position (e.g., at 1:01 mark) at slower speed so that the transition takes more than a second. To do so, the playback rate may be decreased during the transition. That is, the perceived speed of playback of the video may be decreased during the transition so that the presentation moves more slowly between the adjacent framing than with normal playback rate.

In some implementations, the change in playback rate for the visual content in a panning transition may be determined based on user input. For example, a user interface may include options for a user to set and/or modify the playback rate in a panning transition. The value of the playback rate may be set/modified for individual panning transition or for multiple panning transition. The value of the playback rate may be set/modified based on maximum and/or minimum panning transition duration. For example, a user may set the maximum/minimum amount of time that a panning transition should take during playback, and the playback rate in the panning transition may be decreased/increased to fit within the maximum/minimum amount.

In some implementations, the change in playback rate for the visual content in a panning transition may be determined automatically. For example, the value of the playback rate may be determined based on analysis of the video content and/or the context of the video content. For instance, analysis of the video content and/or the context of the video content may indicate that portions of the visual content between the two framing positions are of little interest to a user. In such a case, the playback rate in a panning transition may be increased so that less time in the presentation is taken up by the panning transition than at normal playback rate. Analysis of the video content and/or the context of the video content may indicate that portions of the visual content between the two framing positions are of interest to a user. In such a case, the playback rate in a panning transition may be decreased so that more time in the presentation is taken up by the panning transition than at normal playback rate.

Generating a presentation may include displaying the presentation on one or more display. For example, a view of the video may be generated to include the extents of the visual content within the viewing window, with the viewing window changing (e.g., in viewing direction, in viewing size, in viewing rotation, in viewing projection) as a function of progress through the progress length of the visual content based on the framing of the visual content.

Generating a presentation may include generating one or more files used to present the extents of the visual content within the viewing window on one or more display. The file(s) may be used to present the visual content within the viewing window at the time of the generation and/or at a later time. For example, generating a presentation may include generating encoded video content that includes the extents of the visual content within the viewing window and/or instructions for rendering the presentation using the viewing window within the visual content. For example, the presentation may be generated as an encoded version of a video clip, and the video clip may be opened in a video player for presentation. The presentation may be generated as instructions for presenting visual content, such as instructions defining the viewing window as a function of progress through the progress length (e.g., listing the viewing direction, the viewing size, the viewing rotation, and the viewing projection for time stamps within the video). A video player may use the instructions to retrieve the portions of the visual content identified in the instructions for presentation when the video/instructions are opened/to be presented.

In some implementations, the presentation of the video content based on the framing of the visual content may be provided as a "default" view for the video. That is, presentation of a video may include those extents of the visual content of the video within the viewing windows corresponding to the framing of the visual content. A user may manually change in which direction one or more viewing windows are directed and/or the size/rotation of the viewing window(s). When a user stops manual change of the viewing window(s), the viewing window(s) may return to the viewing direction(s), viewing size(s), and/or viewing rotation(s) determined based on the framing of the visual content (return to the "default" view).

In some implementations, presentation of the video content based on the framing of the visual content may include playback of one or more portions of the audio content. The portion(s) of the audio content included in the playback may be selected based on spatiality and/or directionality of the audio content (e.g., selecting portion of the audio content originating from an audio source within the viewing window) and/or other information.

Presentation information defining the presentation (e.g., encoded video clip, instructions) may be stored in one or more storage media. For example, the presentation information may be stored in the electronic storage 13, remote storage locations (storage media located at/accessible through a server), and/or other locations. In some implementations, the presentation information may be stored through one or more intermediary devices. For example, the processor 11 may be located within a computing device without a connection to the storage device (e.g., the computing device lacks WiFi/cellular connection to the storage device). The presentation information may be stored through another device that has the necessary connection (e.g., using a WiFi/cellular connection of a paired mobile device, such as a smartphone, tablet, laptop, to store information in one or more storage media). Other storage locations for and storage of the presentation information are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
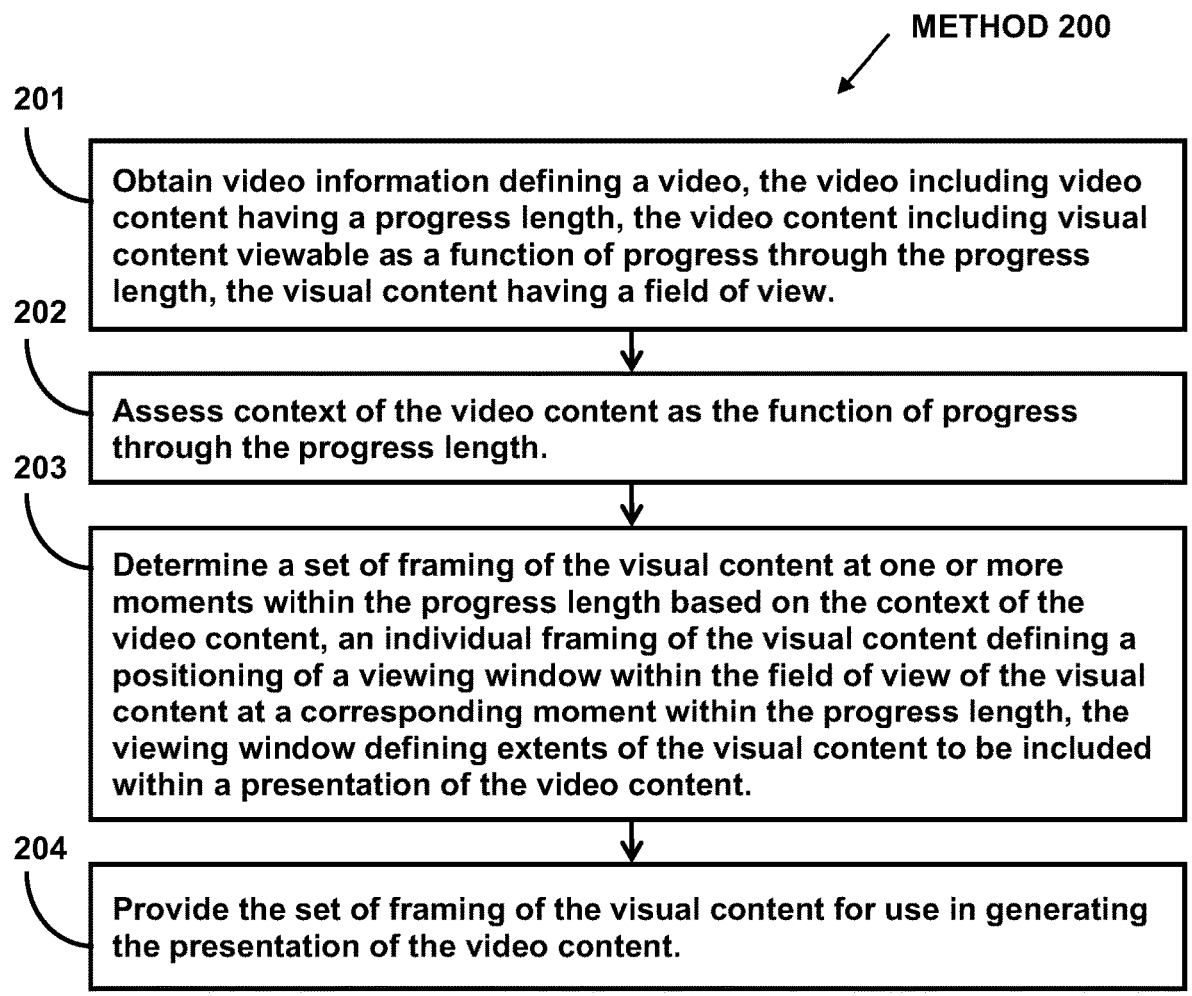
FIG. 2 illustrates an example method for suggesting framing of videos.

FIG. 2 illustrates method 200 for suggesting framing of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information defining a video may be obtained. The video may include video content having a progress length. The video content may include visual content viewable as a function of progress through the progress length. The visual content may have a field of view. In some implementation, operation 201 may be performed by a processor component the same as or similar to the video information component 102 (Shown in FIG. 1 and described herein).

At operation 202, context of the video content as the function of progress through the progress length may be assessed. In some implementation, operation 202 may be performed by a processor component the same as or similar to the context component 104 (Shown in FIG. 1 and described herein).

At operation 203, a set of framing of the visual content at one or more moments within the progress length may be determined based on the context of the video content. An individual framing of the visual content may define a positioning of a viewing window within the field of view of the visual content at a corresponding moment within the progress length. The viewing window may define extents of the visual content to be included within a presentation of the video content. In some implementation, operation 203 may be performed by a processor component the same as or similar to the framing component 106 (Shown in FIG. 1 and described herein).

At operation 204, the set of framing of the visual content may be provided for use in generating the presentation of the video content. In some implementation, operation 204 may be performed by a processor component the same as or similar to the provision component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for suggesting framing of videos, the system comprising:
   one or more physical processors configured by machine-readable instructions to:
   obtain video information defining a video, the video including video content having a progress length, the video content including visual content viewable as a function of progress through the progress length, the visual content having a field of view, wherein a set of framing of the visual content is determined for one or more moments within the progress length, individual framings of the visual content defining a positioning of a viewing window within the field of view of the visual content at a corresponding moment within the progress length, the viewing window defining extents of the visual content to be included within a presentation of the video content; and
   present the set of framing of the visual content within a user interface, wherein one or more of the individual framings of the visual content are selectable by a user through the user interface for use in generation of the presentation of the video content.

2. The system of claim 1, wherein:
   the set of framing of the visual content includes a first framing of the visual content at a first moment within the progress length and a second framing of the visual content at a second moment within the progress length, the second framing of the visual content different from the first framing of the visual content; and
   the presentation of the video content includes a panning transition between the first framing of the visual content at the first moment within the progress length and the second framing of the visual content at the second moment within the progress length, the panning transition including an increase in playback rate for the visual content.

3. The system of claim 1, wherein at least two of the individual framings of the visual content that are selectable by the user through the user interface for use in the generation of the presentation of the video content include different framings of the visual content for a single moment within the progress length.

4. The system of claim 3, wherein multiple ones of the different framings of the visual content are selectable for the single moment within the progress length.

5. The system of claim 1, wherein the user interface includes a bar representing the progress length, the set of framing of the visual content are positioned along the bar, and location of the individual framings of the visual content along the bar represents the corresponding moment within the progress length.

6. The system of claim 1, the user interface includes a depiction of an extent of the visual content to be included within the presentation of the video content based on a given framing of the visual content.

7. The system of claim 6, wherein the depiction of the extent of the visual content includes a preview image.

8. The system of claim 6, wherein the depiction of the extent of the visual content includes a preview video clip.

9. The system of claim 1, wherein the set of framing of the visual content is determined for one or more moments within the progress length based on context of the video content.

10. A method for suggesting framing of videos, the method performed by a computing system including one or more processors, the method comprising:
    obtaining, by the computing system, video information defining a video, the video including video content having a progress length, the video content including visual content viewable as a function of progress through the progress length, the visual content having a field of view, wherein a set of framing of the visual content is determined for one or more moments within the progress length, individual framings of the visual content defining a positioning of a viewing window within the field of view of the visual content at a corresponding moment within the progress length, the viewing window defining extents of the visual content to be included within a presentation of the video content; and
    presenting, by the computing system, the set of framing of the visual content within a user interface, wherein one or more of the individual framings of the visual content are selectable by a user through the user interface for use in generating the presentation of the video content.

11. The method of claim 10, wherein:
    the set of framing of the visual content includes a first framing of the visual content at a first moment within the progress length and a second framing of the visual content at a second moment within the progress length, the second framing of the visual content different from the first framing of the visual content; and
    the presentation of the video content includes a panning transition between the first framing of the visual content at the first moment within the progress length and the second framing of the visual content at the second moment within the progress length, the panning transition including an increase in playback rate for the visual content.

12. The method of claim 10, wherein at least two of the individual framings of the visual content that are selectable by the user through the user interface for use in generating the presentation of the video content include different framings of the visual content for a single moment within the progress length.

13. The method of claim 12, wherein multiple ones of the different framings of the visual content are selectable for the single moment within the progress length.

14. The method of claim 10, wherein the user interface includes a bar representing the progress length, the set of framing of the visual content are positioned along the bar, and location of the individual framings of the visual content along the bar represents the corresponding moment within the progress length.

15. The method of claim 10, the user interface includes a depiction of an extent of the visual content to be included within the presentation of the video content based on a given framing of the visual content.

16. The method of claim 15, wherein the depiction of the extent of the visual content includes a preview image.

17. The method of claim 15, wherein the depiction of the extent of the visual content includes a preview video clip.

18. The method of claim 10, wherein the set of framing of the visual content is determined for one or more moments within the progress length based on context of the video content.

19. A system for suggesting framing of videos, the system comprising:
one or more physical processors configured by machine-readable instructions to:
obtain video information defining a video, the video including video content having a progress length, the video content including visual content viewable as a function of progress through the progress length, the visual content having a field of view, wherein a set of framing of the visual content is determined for one or more moments within the progress length based on context of the video content, individual framings of the visual content defining a positioning of a viewing window within the field of view of the visual content at a corresponding moment within the progress length, the viewing window defining extents of the visual content to be included within a presentation of the video content; and
present the set of framing of the visual content within a user interface, the user interface including a bar representing the progress length, the set of framing of the visual content positioned along the bar, and location of the individual framings of the visual content along the bar represents the corresponding moment within the progress length, wherein one or more of the individual framings of the visual content are selectable by a user through the user interface for use in generation of the presentation of the video content.

20. The system of claim 19, wherein at least two of the individual framings of the visual content that are selectable by the user through the user interface for use in the generation of the presentation of the video content include different framings of the visual content for a single moment within the progress length.

* * * * *